United States Patent

Wilsey

[11] Patent Number: 6,139,233
[45] Date of Patent: Oct. 31, 2000

[54] RAPID SPOOLING/TIGHTENING BINDING DEVICE

[76] Inventor: James T. Wilsey, P.O. Box 424, Loxley, Ala. 36551

[21] Appl. No.: 09/018,524

[22] Filed: Feb. 4, 1998

[51] Int. Cl.[7] ........................................... B60P 7/08
[52] U.S. Cl. .......................... 410/100; 410/96; 410/103; 410/156; 16/114 R; 74/544
[58] Field of Search ................... 410/12, 96, 97, 410/100, 103, 156; 16/114 R; 7/168; 74/544, 545; 81/177.2, 177.7, 177.9, 489; 254/DIG. 3

[56] References Cited

U.S. PATENT DOCUMENTS

| | | | |
|---|---|---|---|
| 1,396,140 | 11/1921 | Nelson | 16/114 R X |
| 2,946,563 | 7/1960 | Eaton | 410/103 X |
| 3,053,508 | 9/1962 | Schultz | 410/103 X |
| 3,119,278 | 1/1964 | Simpson | 74/544 X |
| 3,240,473 | 3/1966 | Coffey et al. | 410/103 |
| 4,227,286 | 10/1980 | Holmberg . | |
| 4,297,916 | 11/1981 | Burroughs | 74/544 |
| 4,367,993 | 1/1983 | Meigs | 410/103 |
| 4,510,652 | 4/1985 | Van Iperen . | |
| 4,873,742 | 10/1989 | Dillon | 254/DIG. 3 X |
| 4,913,608 | 4/1990 | Royball | 410/103 |
| 5,425,154 | 6/1995 | Edwards, Jr. | 16/114 R X |
| 5,429,463 | 7/1995 | Howell | 410/156 |
| 5,433,565 | 7/1995 | Chan | 410/103 |
| 5,524,505 | 6/1996 | Lawrence | 74/544 |
| 5,549,249 | 8/1996 | Sergent | 410/96 |
| 5,791,844 | 8/1998 | Anderson | 410/103 |
| 5,800,105 | 9/1998 | Stump | 410/103 |
| 6,056,488 | 5/2000 | Depoy | 410/100 |

*Primary Examiner*—Stephen T. Gordon
*Attorney, Agent, or Firm*—Joseph N. Breaux

[57] ABSTRACT

A rapid spooling/tightening binding device includes a uniquely designed winch winder mechanism having a rotatable shaft substantially aligned with the center axis of the winch and which is couplable to a drill to rapidly spool the binding strap about a strap spooling reel. In the preferred embodiment, the drill is a cordless drill. The winch winder mechanism is removably coupled to the winch for use with other binding devices.

7 Claims, 1 Drawing Sheet

ND BINDING DEVICE

RAPID SPOOLING/TIGHTENING BINDING DEVICE

TECHNICAL FIELD

The present invention relates to binding devices used to strap cargo on trucks and, more particularly, to a rapid spooling/tightening binding device including a uniquely designed winch winder mechanism having a rotatable shaft substantially aligned with the center axis of the winch and which is couplable to a drill to rapidly spool the binding strap about a strap spooling reel wherein, in the preferred embodiment, the drill is a cordless drill. The winch winder mechanism is removably coupled to the winch for use with other binding devices.

BACKGROUND OF THE INVENTION

A plurality of straps for tying down cargo such as, without limitation, lumber, plywood, pipe, pallets, brick, and other objects are known. In most instances, a wrench, crank or other type of mechanism providing a handle is used to spool the straps when not in use and/or tighten the straps around the cargo. Typically, a truck is equipped with 8–12 binding devices which are used to secure the cargo to the flat-bed of the truck. However, a significant amount of time is used when the driver or other personnel must manually turn the handle repeatedly to tighten the strap of each binding device around the cargo or to spool the strap of each binding device after unloading. As can be appreciated, it is desirable to provide a binding device having a winch winding mechanism which rapidly spools and/or tightens the strap of a binding device.

Several devices have been patented which are aimed at binding devices.

U.S. Pat. No. 5,433,565, by Chan, entitled "WINCH BAR" discloses a winch bar for winding a winch having a winding drum with an annular wall. A plurality of winch bar receiving apertures extends diametrically through the drum on opposite sides of the wall. The winch bar is designed to be received in two of the apertures wherein the winch bar traverses the center axis of the winch as the winch bar is secured in the two apertures. The winch bar provides a hand for rotating the winch about the center axis of the winding drum.

U.S. Pat. No. 4,913,608, by Royball, entitled "STRAP TIGHTENING DEVICE" discloses a strap tightening device including a frame having a drum rotationally mounted thereto. The drum is provided with an extension having a plurality of borehole openings for receiving a bar to facilitate rotating the drum. Alternately a box shaped opening is provided for receiving a box wrench. The box wench or the bar is used to rotate the drum in a counter-clockwise direction to wrap the strap about the drum in order to cinch the strap down over the cargo U.S. Pat. No. 4,510,652, by van Iperen, entitled "CARGO RESTRAINING DEVICE" discloses a cargo restraining device for securing thereto a strap around a cylinder. The cylinder is rotated via a removable socket having a cylindrical wall and a lugengaging cross pin for releasably engaging the split lug protruding from the cylinder. A lug wrench square socket opening is provided at the opposite end of the socket to be releasably engaged by a square lug socket ratchet wrench for rotating the socket and cylinders to tighten the strap.

U.S. Pat. No. 4,367,993, by Meigs, entitled "TRUCK LOAD BINDER TIGHTENER" discloses a binder tightener including a shaft having one end formed for receiving a tool for turning the shaft. Meigs discloses that a nut may be welded on the end of the shaft, preferably a hexagonal nut so that an air-driven socket wrench can be applied to the nut to turn the shaft in order to wind the chain around the sprocket and thereby tightened the load binder. Furthermore, the nut and shaft may be provided with a through passage in which a bar or rod can be inserted for turning the shaft. The problem with an air-driven socket wrench is that air hoes and a source of air for driving the air-socket wrench are required.

U.S. Pat. No. 4,227,286, by Holmberg, entitled "STRAP TIGHTENER" discloses a strap tightener including a strap reel and an operating lever which is pivoted at one end thereof on the strap reel. The operating lever consists of two limbs rigidly interconnected by means of a riveted web and a handle riveted to the other end of the operating lever.

U.S. Pat. No. 3,240,473, by Coffey et al., entitled "LOAD BINDING DEVICE COMPRISING WINCH MEANS AND EQUALIZER MEANS" discloses a binding device using a crank to wind a winch member. The crank is attached to a square shaft which extends from the cylindrical portion of a longitudinal worm gear. The longitudinal worm gear is rotated in a clockwise direction to rotate in a clockwise direction a winch member.

It can be readily seen that there exists the continuing need for a rapid spooling/tightening binding device including a uniquely designed winch winder mechanism having a rotatable shaft substantially aligned with the center axis of the winch and which is couplable to a drill to rapidly spool the binding strap about a strap spooling reel wherein, in the preferred embodiment, the drill is a cordless drill. The winch winder mechanism is removably coupled to the winch for use with other binding devices.

SUMMARY OF THE INVENTION

The preferred embodiment of the rapid spooling/tightening binding device of the present invention solves the aforementioned problems in a straight forward and simple manner. What is provided is a rapid spooling/tightening binding device including a uniquely designed winch winder mechanism having a rotatable shaft substantially aligned with the center axis of the winch and which is couplable to a drill to rapidly spool the binding strap about a strap spooling reel wherein, in the preferred embodiment, the drill is a cordless drill. The winch winder mechanism is removably coupled to the winch for use with other binding devices.

The rapid spooling/tightening binding device of the present invention comprises: a strap spooling reel; a strap coupled to said strap spooling reel; a winch coupled to said strap spooling reel having an annular wall wherein said annular has formed therein at least one aperture; and, a winch winder mechanism for rapidly winding said winch to rapidly spool or tighten said strap around said strap spooling reel.

The winch winder mechanism comprises: a housing member receivable in said winch; a shaft support member pivotally coupled in said housing member wherein said shaft support member comprises: a leg member pivotally coupled to said housing member, and a foot member coupled to one distal end of said leg member wherein a portion of said foot member is receivable in said at least one aperture; a shaft rigidly coupled to one distal end of said leg member wherein said shaft is substantially aligned with a center axis of said winch and said strap spooling reel and wherein as said shaft is rotated in a first direction said strap spooling reel spools or tightens said strap.

The housing member has a top wall, a bottom wall and a side wall to form an U-shaped channel. The leg member has a rectangular box profile and wherein said leg member is spaced from said side wall a predetermined distance to provide clearance for pivoting said leg member in said U-shaped channel. The foot member comprises: a protrusion which is receivable within said at least one aperture wherein in an un-pivoted position said protrusion projects a distance beyond a free edge of said top wall and said bottom wall; and, a heel portion having a curved profile wherein the curved profile of said heel portion allows said foot member to be pivoted the necessary amount in the U-shaped channel to decrease the distance said protrusion projects beyond said free edge of said top wall and said bottom wall to slide said housing member in said winch.

The shaft is dimensioned to be received in a drill chuck of a drill for rapid rotation of said shaft to rapidly spool, un-spool, un-tighten or tighten said strap.

In view of the above, an object of the present invention is to provide a rapid spooling/tightening binding device including a winch winder mechanism which is rotatable via the rapid rotary momentum of a drill. In the preferred embodiment, the drill is a cordless drill having rechargeable batteries. Furthermore, the drill should be of the type which can reverse the direction of rotation in order to spool and un-spool the strap about the strap spooling reel.

Another object of the present invention is to provide a rapid spooling/tightening binding device which significantly minimizes the amount of time required to spool and/or tighten the straps. For example, a strap having most of its length un-spooled can be spooled in as little time as six seconds.

A further object of the present invention is to provide a winch winder mechanism which can be coupled to existing winches of the type having at least one aperture formed in the annular wall thereof wherein such aperture is used to couple a bar or other means to provide a handle and the center of the annular wall is hollow.

It is a still further object of the present invention to provide a rapid spooling/tightening binding device which uses a power tool (drill) in lieu of manual force to turn the strap spool reel when tightening the strap of the binding device in order to maximize the strapping force of the strap about the cargo.

It is a still further object of the present invention to provide a winch winder mechanism which is removably coupled to a winch.

In view of the above objects, it is a feature of the present invention to provide a rapid spooling/tightening binding device which is simple to manufacture.

Another feature of the present invention is to provide a winch winder mechanism which is relatively simple structurally.

A further feature of the present invention is to provide a winch winder mechanism which is easy to use to spool, un-spool and/or tighten a strap of a binding device.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
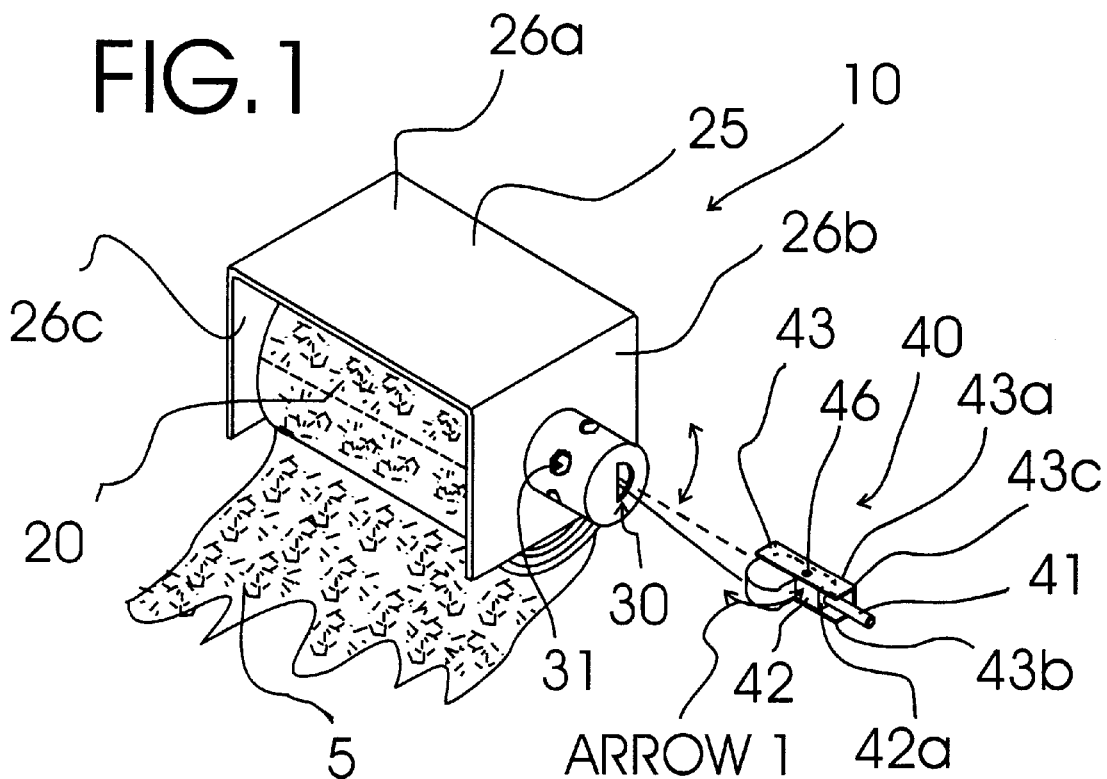
FIG. 1 illustrates a view of the preferred embodiment of a rapid spooling/tightening binding device of the present invention; and, FIG. 2 illustrates perspective view of the winch winder mechanism of the embodiment of FIG. 1.
Figure 2:
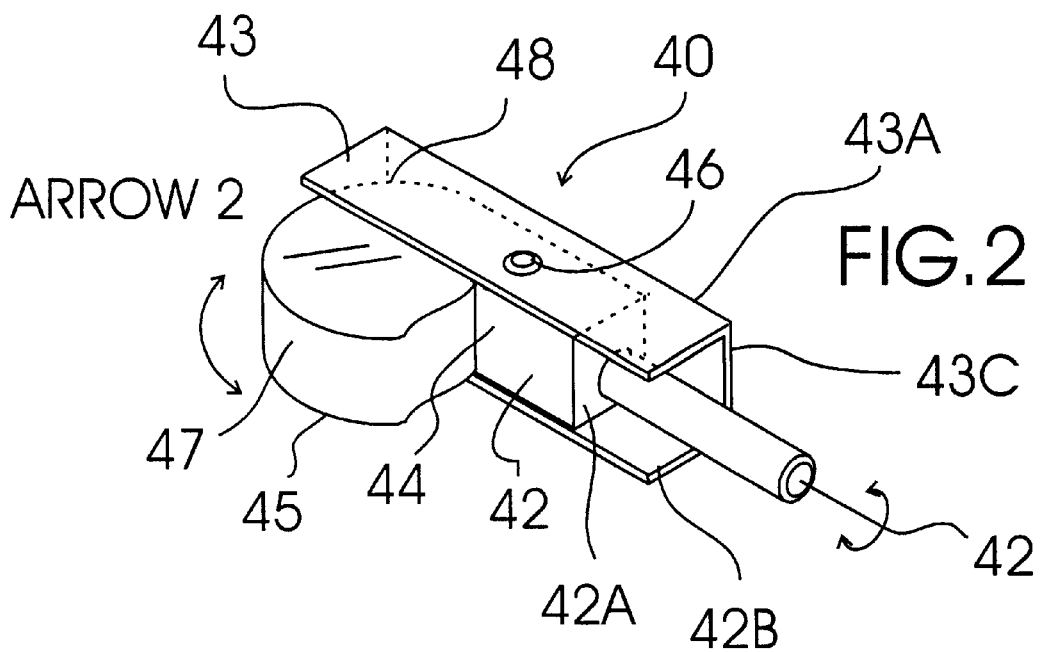

Referring now to the drawings, and in particular FIGS. 1–2, the rapid spooling/tightening binding device of the present invention is designated generally by the numeral 10. Rapid spooling/tightening binding device 10 is comprised of strap spooling reel 20 coupled in reel housing 25, winch 30 and winch winder mechanism 40.

Strap spooling reel 20 has spooled therearound strap 5. Strap spooling reel 20 is supported by reel housing 25. The design of strap spooling reel 20 and reel housing 25 of rapid spooling/tightening binding device 10 may be any design readily available. As shown in FIG. 1, housing 25 comprises top wall 26a, having two side walls 26b and 26c coupled perpendicularly to the right and left edges, respectively, of top wall 26a. The two side walls 26b and 26c have rotatably coupled thereto perpendicularly strap spooling reel 20. Strap spooling reel 20 has coupled thereto winch 30 wherein winch 30 may be an extension of strap spooling reel 20.

In the preferred embodiment, strap 5 is made of nylon. Nevertheless, strap 5 may be made of other durable material. Furthermore, in lieu of a strap, other strapping means such as chains, cables or the like may be substituted.

In the preferred embodiment, while not shown, strap spooling reel 20 would be provided with a means to hold the spooled, tightened positions, such as without limitation a ratchet mechanism or other locking means to hold the spooled strap.

Typically, a truck of the type having a flat-bed may require 8–12 binding devices to secure the cargo on the flat-bed wherein the binding devices are affixed to the truck in spaced relation.

Winch 30 has an annular cross-section and the center axis thereof is aligned with the center axis of strap spooling reel 20. Winch 30 has formed therein a plurality of circumferentially spaced apertures 31.

Winch winder mechanism 40 comprises shaft 41, shaft support member 42 and housing member 43. Housing member 43 comprises top wall 43a, bottom wall 43b and side wall 43c coupled together to form an U-shaped channel for receiving therein shaft support member 42.

In the preferred embodiment, winch winder mechanism 40 is made of steel.

Shaft support member 42 comprises leg member 44 having a rectangular box profile having journalled through one distal end thereof shaft 41 wherein shaft 41 is rigidly coupled to wall 42a. Shaft support member 42 further comprises foot member 45 coupled to the other distal end of leg member 44. Shaft support member 42 is secured in housing member 43 via rivet coupling 46. Shaft support member 42, when coupled in the U-shaped channel, is distanced from side wall 43c to allow shaft support member 42 to pivot about rivet coupling 46 in the direction of ARROW 1 or ARROW 2. In other words, shaft support member 42 is capable of see-sawing in housing member 43 about rivet coupling 46. The see-sawing motion allows protrusion 47 to be coupled in one of the plurality of apertures 31 to secure winch winder mechanism 40 in winch 30. The see-sawing motion also allows protrusion 47 to be removed from one of the plurality of apertures 31 to remove winch winder mechanism 40 from winch 30.

In the preferred embodiment, leg member 44 of shaft support member 42 has a height and a width of approximately ½ of an inch.

Foot member 45 provides protrusion 47 which is receivable within one of the plurality of apertures 31. In the preferred embodiment, protrusion 47 has a curved outer contour. Foot member 45 also has heel portion 48 which has a curved contour. The curved heel portion 48 allows foot member 45 to be pivoted the necessary amount in the U-shaped channel to slide winch winder mechanism 40 in winch 30. As shaft support member 42 is coupled in the U-shaped channel and aligned therein, protrusion 47 when foot member 45 is not pivoted projects a distance beyond the free edge of top wall 43*a* and bottom wall 43*b*.

The total width of housing member 43 and protrusion 47 is greater than the diameter if winch 30. Therefore, to slide winch winder mechanism 40 in winch 30, foot member 45 must be pivoted in the direction of side wall 43*c* to minimize the radial projection length of protrusion 47 from the free edge of top wall 43*a* and bottom wall 43*b*. After, winch winder mechanism 40 is slid into winch 30, foot member 45 is pivoted such that protrusion 47 of foot member 45 is received in one of the plurality of apertures 31. Protrusion 47 of foot member 45 serves to maintain winch winder mechanism 40 in winch 30.

After, winch winder mechanism 40 is coupled to winch 30, a drill (not shown) is coupled to shaft 41. As shaft 41 rotates in a first direction, strap spooling reel 20 is rotated about its center axis to spool strap 5 therearound. Furthermore, as shaft 41 is rotated in the first direction, strap 5 may be tightened around the cargo placed on the flat-bed of a truck. As shaft 41 is rotated in a second direction which is opposite the first direction, strap 5 may be un-spooled or un-tightened, accordingly.

As can be appreciated, the pivotal coupling of shaft support member 42 allows winch winder mechanism 40 to be removed from winch 30 and used on another binding device coupled to the truck. In other words, housing member 43 can be removed from winch 30 by pivoting protrusion 47 out of the aperture and sliding housing member 43 out of winch 30.

In the preferred embodiment, shaft 41 of winch winder mechanism 40 is coupled to a cordless drill (not shown). In the preferred embodiment, a ⅜" shaft may be used to fit into a drill chuck of the drill. The drill should be capable of reverse rotation to allow winch winder mechanism 40 to reverse the rotation of winch 30. Furthermore, drill preferably will be provided with a recharger having a means which can be plugged into a cigarette lighter or other outlet provided on the truck to allow the batteries of the drill to be recharged for future use form the vehicle's battery. For example, a typical cordless drill is provided with a single removable 7.2 volt six cell battery pack.

As can be appreciated the rapid rotary operation of the drill significantly minimizes the amount of time required to spool, un-spool and/or tighten the strap of a binding device.

It is noted that the embodiment of the rapid spooling/tightening binding device described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A rapid spooling/tightening binding device comprising:

a strap spooling reel;

a strap coupled to said strap spooling reel;

a winch coupled to said strap spooling reel having an annular wall wherein said annular has formed therein at least one aperture;

a winch winder mechanism for winding said winch to rapidly spool or tighten said strap around said strap spooling reel wherein said winch winder mechanism comprises:

a housing member receivable in said winch;

a shaft support member pivotally coupled in said housing member wherein said shaft support member comprises:

a leg member pivotally coupled to said housing member, and a foot member coupled to one distal end of said leg member wherein a portion of said foot member is receivable in said at least one aperture;

a shaft rigidly coupled to one distal end of said leg member wherein as said shaft is substantially aligned with a center axis of said winch and said strap spooling reel and wherein as said shaft is rotated in a first direction said strap spooling reel spools or tightens said strap.

2. The binding device of claim 1, wherein said housing member is a U-shaped channel, said housing member comprises:

a top wall;

a bottom wall; and a side wall having coupled to a top edge thereof said top wall and having coupled to a bottom edge thereof said bottom wall.

3. The binding device of claim 2, wherein said leg member has a rectangular box profile and wherein said leg member is spaced from said side wall a predetermined distance to provide clearance for pivoting said leg member in said U-shaped channel.

4. The binding device of claim 3, wherein said foot member comprises:

a protrusion which is receivable within said at least one aperture wherein in an un-pivoted position said protrusion projects a distance beyond a free edge of said top wall and said bottom wall; and, a heel portion having a curved profile wherein the curved profile of said heel portion allows said foot member to be pivoted the necessary amount in the U-shaped channel to decrease the distance said protrusion projects beyond said free edge of said top wall and said bottom wall to slide said housing member in said winch.

5. The binding device of claim 1, wherein said shaft is dimensioned to be received in a drill chuck of a drill for rapid rotation of said shaft to rapidly spool, un-spool, un-tighten or tighten said strap.

6. The binding device of claim 5, wherein said drill is a cordless drill.

7. The binding device of claim 1, wherein said winch winder mechanism is removably coupled to said winch.

* * * * *